United States Patent
Terada et al.

(10) Patent No.: US 10,377,325 B2
(45) Date of Patent: Aug. 13, 2019

(54) SLIDE PROTECTOR

(71) Applicant: Yazaki Corporation, Tokyo (JP)

(72) Inventors: Tomoyasu Terada, Makinohara (JP);
Tsukasa Sekino, Makinohara (JP);
Shinji Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 330 days.

(21) Appl. No.: 14/978,400

(22) Filed: Dec. 22, 2015

(65) Prior Publication Data
US 2016/0186803 A1 Jun. 30, 2016

(30) Foreign Application Priority Data
Dec. 25, 2014 (JP) ................. 2014-261685

(51) Int. Cl.
F16M 13/00 (2006.01)
B60R 16/02 (2006.01)
B60N 2/07 (2006.01)
B60N 2/02 (2006.01)

(52) U.S. Cl.
CPC ........ B60R 16/0215 (2013.01); B60N 2/0722 (2013.01); B60N 2002/0264 (2013.01)

(58) Field of Classification Search
CPC .............. B60R 16/0215; B60N 2/0722; B60N 2002/0264
USPC ............... 248/424, 425, 429, 430; 297/344.1
See application file for complete search history.

(56) References Cited

U.S. PATENT DOCUMENTS 5,950,978 A * 9/1999 Eguchi ................. B60N 2/067
248/429

FOREIGN PATENT DOCUMENTS

| JP | 2011-025743 A |   | 2/2011 |          |
|----|---------------|---|--------|----------|
| JP | 2011025746 A  | * | 2/2011 | B60N 2/06 |
| JP | 2012-020700 A |   | 2/2012 |          |
| JP | 2012-020700 A |   | 2/2012 |          |
| JP | 2013201877    | * | 10/2013 |         |
| JP | 2014230339    | * | 12/2014 |         |
| JP | 201507435     | * | 5/2015  |         |

OTHER PUBLICATIONS

Notification of Reasons for Refusal drafted Dec. 1, 2016, issued for the Japanese patent application No. 2014-261685 and English translation thereof.

* cited by examiner

Primary Examiner — Gwendolyn W Baxter
(74) Attorney, Agent, or Firm — Locke Lord LLP

(57) ABSTRACT

A slide protector slidably engaged with a slide rail together with a slide support has a harness holder holding a wire harness and a hooking section capable of hooking the slide support with the harness holder and the hooking section formed integrally. Though the wire harness causes a resistance force when the slide support slides rearward in the sliding direction and the slide protector is pulled rearward, reliability of the attachment structure of the slide protector to the slide support can be enhanced since the hooking section and the harness holder holding the wire harness are formed integrally.

6 Claims, 7 Drawing Sheets

FRONT SIDE / REAR SIDE

SLIDING DIRECTION

SLIDE PROTECTOR

BACKGROUND

Technical Field

The present invention relates to a slide protector slidably engaged with a guide rail, together with a slide support supporting a slide structure.

Related Art

Conventionally it has been known that to supply electric power to a slide seat of an automobile continuously, a slide support of a slide seat and a slide protector mounted on the slide support are slidably engaged with a guide rail disposed on a vehicle floor and a wire harness is arranged from the vehicle floor side to the slide seat side through the slide protector to continuously supply power.

As such a slide protector, one provided with a wire harness holder for holding the wire harness and a hooking section capable of hooking a slide support is proposed (for example, refer to JP 2012-20700 A). In the slide protector described in JP 2012-20700 A, a member having a hooking section is mounted on a slide protector and the hooking section is allow to hook a notch (receiving portion) of a slide support. Due to such a configuration, the slide protector is configured to conduct a following movement while being pulled by the slide support that slides.

However, the wire harness that the slide protector holds has a corrugate tube and a resistance force may work because of the elasticity of the corrugate tube when the slide protector is pulled. When such a resistance force increases, the member having the hooking section may come off the slide protector. Hence, a configuration in which the member having the hooking section is firmly fixed to the slide protector with fixing members or the like can be considered, but the configuration increases the number of components and man-hours for fixing.

This issue can similarly occur in the case of application of the slide protector for continuous power supply to slide doors of automobiles, slide seats and slide doors of vehicles other than automobiles, slide doors or the like of apparatuses other than vehicles such as devices or testing machines without limitation to slide seats of automobiles. Here, these slide seats, slide doors and the like are named slide structures, and vehicle bodies, apparatus bodies and the like are named fixed structures generically.

An object of the present invention is, in view of the above-described points, to provide a slide protector that can enhance reliability of the attachment structure to the slide support.

SUMMARY

To achieve the above-described object, a slide protector of a first aspect of the present invention slidably engaged with a guide rail in a sliding direction together with a slide support for supporting a slide structure, includes: a harness holder configured to hold a wire harness; and a hooking section integrally formed with the harness holder and configured to be capable of hooking the slide support.

From the above-described configuration, the slide protector whose hooking section is hooked on the slide support conducts its following movement by being pulled due to a slide motion of the slide support. At this time, since the hooking section is integrally formed with the harness holder, if the wire harness resists the pulling, it is difficult for the hooking section to come off the slide protector.

According to the slide protector of a second aspect, in the slide protector described in the first aspect, the hooking section includes: an arm extending in the sliding direction; and a hooking protrusion protruding from the arm in a direction perpendicular to the sliding direction and configured to be capable of hooking a recess-shaped receiving portion formed on the slide support.

Due to the above configuration, the hooking of the hooking section of the slide protector on a receiving portion of the slide support allows the slide protector to be attached to the slide support.

According to the slide protector of a third aspect, in the slide protector described in the second aspect, a pair of hooking sections are provided. The pair of the hooking sections are arranged such that a pair of the receiving portions are inserted between the pair of the hooking sections in the direction perpendicular to the sliding direction, and the arm extends along an inner wall surface of the guide rail.

Due to the above structure, when the slide support pulls the slide protector, though a large resistance force of the wire harness forces the pair of the arms to attempt to spread apart from each other to separate a hooking protrusion from the receiving portion, the spreading of the arms is suppressed because of the arms extending along the inner wall surfaces of the guide rail.

According to the slide protector of a fourth aspect, in the slide protector described in the first to third aspects, the slide protector includes: a contacting portion located on a side surface at one side of the slide protector in the sliding direction and configured to be capable of coming into contact with the slide support that slides toward another side.

Due to the above configuration, when the slide support slides to one side, because of the slide protector hooked on the slide support with the hooking section, the slide protector is pulled to the same side. In contract, when the slide support slides to the other side, the slide protector is pushed to this side by contact of the slide support with a contacting portion.

According to the first aspect of the present invention, since the hooking section is integrally formed with the harness holder to make it difficult for the hooking section to come off the slide protector, reliability of the attachment of the slide protector to the slide support can be enhanced.

According to the second aspect of the present invention, the slide protector can be attached to the slide support easily by hooking of the hooking section of the slide protector on the receiving portion of the slide support.

According to the third aspect of the present invention, even if the resistance force of the wire harness is large, suppression of spreading the arms makes it difficult for the hooking protrusion to be separated from the receiving portion and reliability of the attachment of the slide protector to the slide support can be further enhanced.

According to the fourth aspect of the present invention, even when the slide support slides to either one side or the other side in the sliding direction, the slide protector can be made to follow. At the time of the slide to the other side, pushing the slide protector while the slide support keeps in contact with the contacting portion can slide the slide protector in a stable state compared with pushing the slide protector to this side by use of the hooking section.

DETAILED DESCRIPTION

FIGS. 1 to 12 show an embodiment of a backlash restraining structure of the slide protector according to the present invention.

Figure 1:
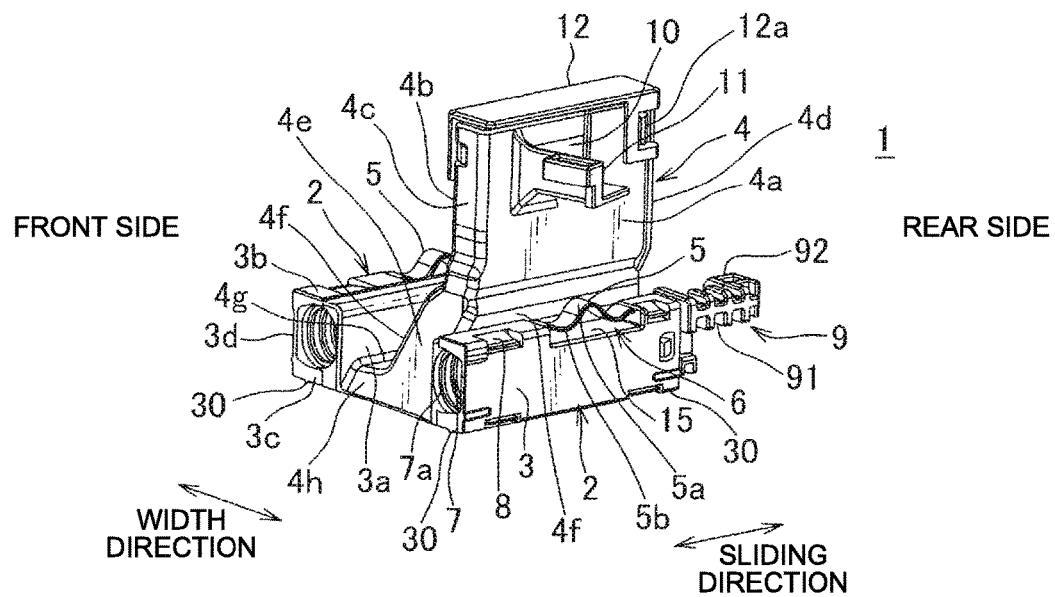
FIG. 1 is a perspective view showing an embodiment of a slide protector according to the present invention.
Figure 2:
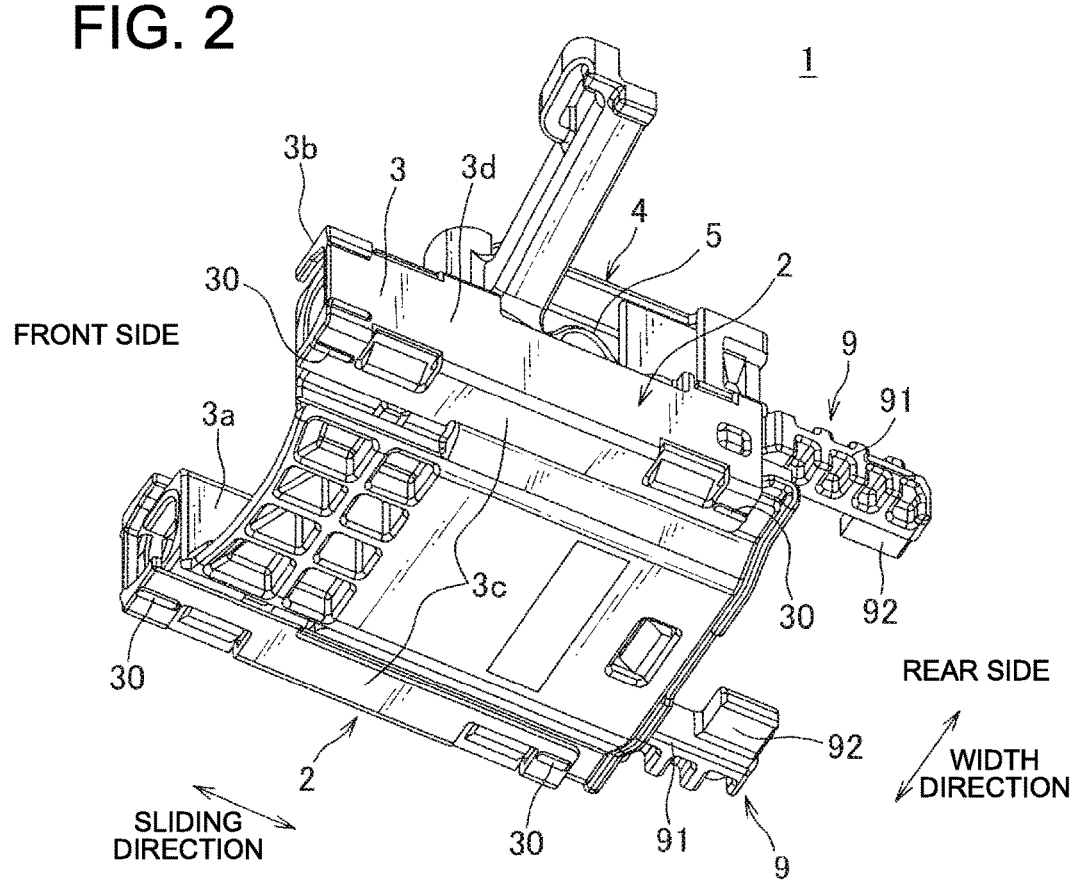
FIG. 2 is a perspective view showing the state of the slide protector viewed from another direction.
Figure 3:
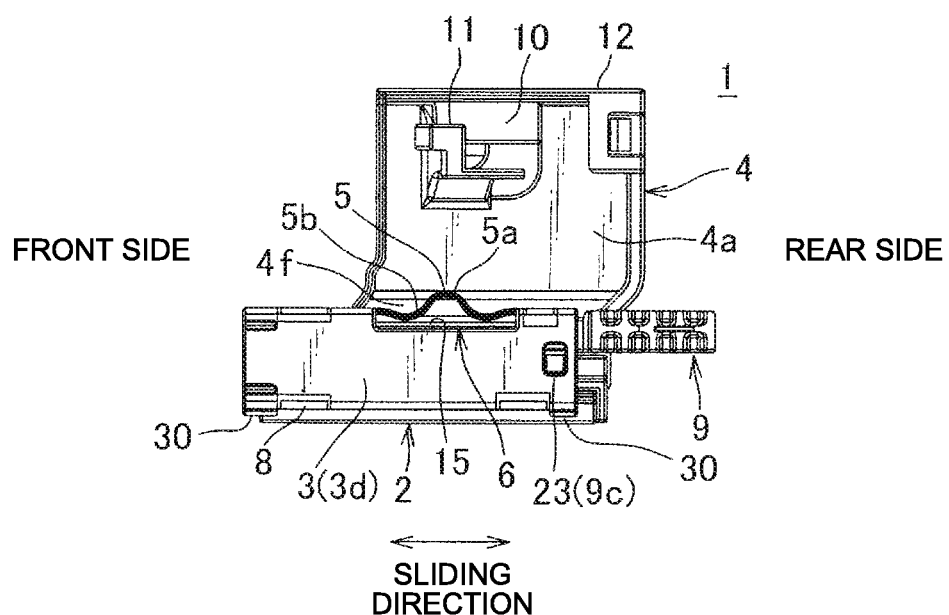
FIG. 3 is a side view showing the slide protector.
Figure 4:
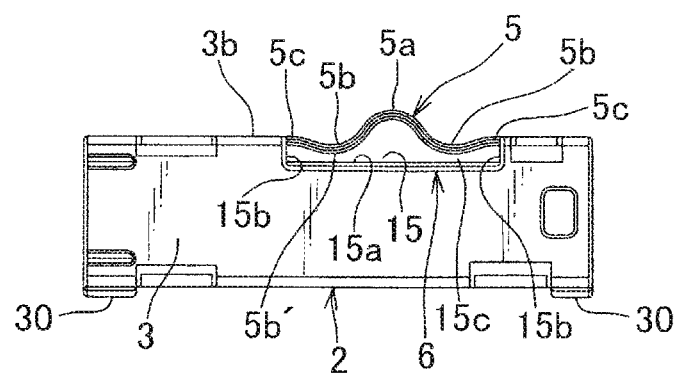
FIG. 4 is a side view showing principal parts of the slide protector.

As shown in FIGS. 1 to 3, a slide protector 1 is made of a synthetic resin and provided with right and left paired harness holders 2, a harness leading section 4 connecting the lower portions of an inner walls 3a of the paired harness holders 2 and centered between these, paired hooking sections 9 capable of hooking a slide support 17 to be described later, and has a feature in which a spring member 5 of roughly W-shaped viewed from the side is provided on the upper part of each harness holder 2 to constitute a backlash restrainer 6 as shown in FIG. 4.

As shown in FIGS. 1 to 3, each harness holder 2 includes upper, lower, right and left walls, namely a surrounding wall 3 whose outer circumferential surface is formed into a rectangular tube shape and whose inner circumferential surface is formed into a circle or an oval. The upper, lower and outer walls 3b to 3d are formed into a U-shape cross-sectionally and can be separated from an inner wall 3a. On the inner circumferential surface of a hole 7 arranged horizontally in the surrounding wall 3, ribs 7a with which concave grooves (valley parts) extending in the circumferential direction on a corrugate tube (protective tube) made of a synthetic resin of a wire harness (not illustrated) engages are formed to protrude.

Two projections 30 protruding toward the lower side is formed on the lower side wall 3c of each of the pared harness holders 2, namely on a side surface opposite to the side surface on which the spring member 5 is mounted. These two projections 30 are provided on both ends of the slide protector 1 in the sliding direction. A convex portion 5a of the spring member 5 is arranged at a slightly rear side relative to the middle portion between the two projections 30 in the sliding direction. Incidentally, arrangement of the convex portion 5a in the middle portion between the two projections 30 is preferable. Further, the two projections 30 do not need to be positioned at the both ends in the sliding direction.

When each harness holder 2 is divided into two toward right and left, the end of each corrugate tube is mounted in the hole 7 of the harness holder 2 and the harness holder 2 is united and engaged with an engaging device 8 to hold the corrugate tube.

The hole 7 of each harness holder 2 penetrates in the front-rear direction, and each electric cable led out backward from the end of the corrugate tube of the wire harness, for example, turns around frontward along an end surface of the hooking section 9 on the front side and is introduced into a harness leading section 4 that is hollow and located in the middle, through a rear opening (not illustrated) located under the harness leading section 4. Then the electric cable is introduced from a side opening 10 provided on the upper side of the harness leading section 4 toward the outside along a guide wall 11 on the upper side and is arranged on a slide seat side (not illustrated). An opening on the top of the harness leading section 4 is blocked with a cover 12.

The pair of the hooking sections 9 are arranged in a row in the width direction that is substantially perpendicular to the sliding direction, and each of the pair of the hooking sections 9 is formed integrally with the inner wall 3a of the surrounding wall 3 of the harness holder 2, and has an arm 91 extending from the rear end of the harness holder 2 in the sliding direction and a hooking protrusion 92 protruding toward the inner side in the width direction from the end of the arm 91. That is, the hooking protrusions 92 of the pair of the hooking sections 9 protrude to approach each other. Each arm 91, when the slide protector 1 is engaged with a guide rail 16 to be described later, extends along an inner surface (inner wall surface) of wall 18a located outside in the width direction and the clearance between the arm 91 and the inner wall surface is formed to be smaller than the protruding length of the hooking protrusion 92.

The harness leading section 4 has right and left walls 4a and 4b that are vertical and wide, front and rear walls 4c and 4d that are vertical and narrow, a front foot wall 4e and right and left foot walls 4f and the cover 12 on the upper side, and each of foot walls 4e and 4f continues to and is connected integrally with a right and left connection walls 4g that are horizontal and connect the paired right and left harness holders 2 and a connection wall 4h that is located on the front side and inclined. The cover 12 is engaged with the wall 4a with an engaging device 12a.

As shown in FIG. 4, a recess portion 15 is formed on the horizontal upper wall 3b on the rear side of the middle portion of each harness holder 2 in the longitudinal direction, and the recess portion 15 includes a horizontal long bottom wall surface (bottom surface) 15a and front and rear vertical short inner wall surfaces (inner surfaces) 15b, and further the front and rear ends of the spring member 5 that is roughly W-shaped viewed from the side are integrally connected with the upper ends of the front and rear inner wall surfaces 15b.

The spring member 5 is made of synthetic resin board integrally formed with the harness holder 2 and includes a curved convex portion (mountain part) 5a at the center and a curved concave portion (inverse-convex portion or valley part) 5b on both front and rear sides to be formed into roughly W-shape viewed from the side or cross-sectionally in the longitudinal direction.

The curved convex portion 5a in the middle of the spring member 5 in the longitudinal direction protrudes upward to be higher than the front and rear ends 5c (it protrudes higher than the upper wall 3b of the harness holder 2 by a length comparable to the depth of the recess portion 15), and the concave portions 5b between the curved convex portion 5a and the front and rear ends 5c protrude downward to be lower than the front and rear ends 5c. The boundary (connecting part) between the curved convex portion 5a and the curved concave portion 5b continues smoothly without steps or the like. The radius of curvature of the curved convex portion 5a is smaller than that of the curved concave portions 5b. The curved convex portion 5a is formed of an upper arc-shaped peak and front and rear slopes positioned symmetrically in the front-rear direction, and each of the front and rear curved concave portions 5b is formed of an arc-shaped lowermost portion and front and rear slopes arranged symmetrically in the front-rear direction.

The portion of each front and rear curved concave portion 5b, which continues to the curved convex portion 5a is arranged to be high (comparable to the height of the upper wall 3b of the harness holder 2 or higher), and the portion continuing to each of the front and rear ends 5c is arranged to be low. Each end 5c of the front and rear concave portions 5b continues substantially horizontally to the front and rear inner wall surfaces 15b of the recess portion 15 and the front and rear ends 5c are located symmetrically and then the upper surfaces of the front and rear ends 5c are positioned on the same horizontal plane as the upper wall 3b of the harness holder 2 is positioned on. A sufficient clearance (comparable to half of the depth of the recess portion 15) 15c is formed between the lower end of the front and rear curved concave portions 5b and a bottom wall surface 15a of the recess portion 15.

As shown in FIG. 1, the width (width in right-left direction) of the spring member 5 is slightly narrower than the width of the bottom wall surface 15a of the recess portion 15 (FIG. 4) and is formed to have a uniform width over the entire length in the front-rear direction. As shown in FIG. 4, the thickness of the spring member 5 is about ⅓ to ¼ of the depth of the recess portion 15. The length (length in the front-rear direction) of curved convex portion 5a in the middle is comparable with that of each of the front and rear curved concave portions 5b.

As shown in FIG. 3, the curved convex portion 5a in the middle of the spring member 5 protrudes upward to the height comparable to the lower end of the side wall 4a (the upper end of the foot wall 4f) of the harness leading section 4 in the slide protector 1. As shown in FIG. 4, the lowest ends 5b' of the front and rear curved concave portions 5b of the spring member 5 protrude downward up to the position at approximately half of the depth of the recess portion 15. A backlash restrainer 6 is constituted of the spring member 5 and the recess portion 15.

Figure 5:
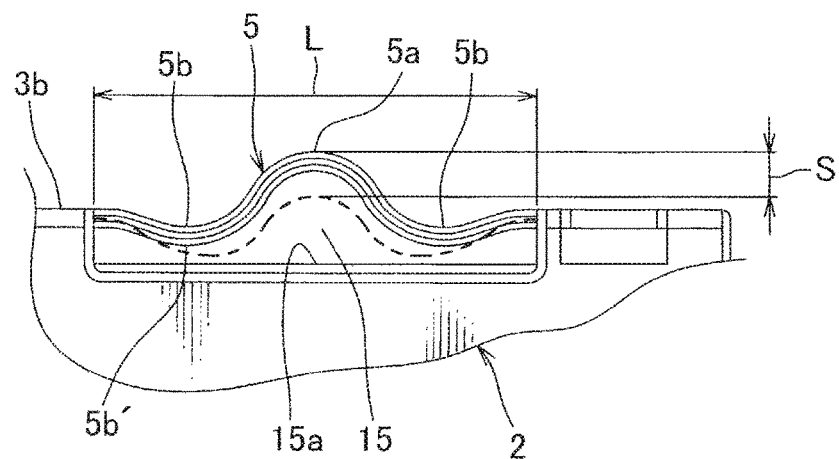
FIG. 5 is a side view showing a backlash restrainer of the slide protector.
Figure 6:
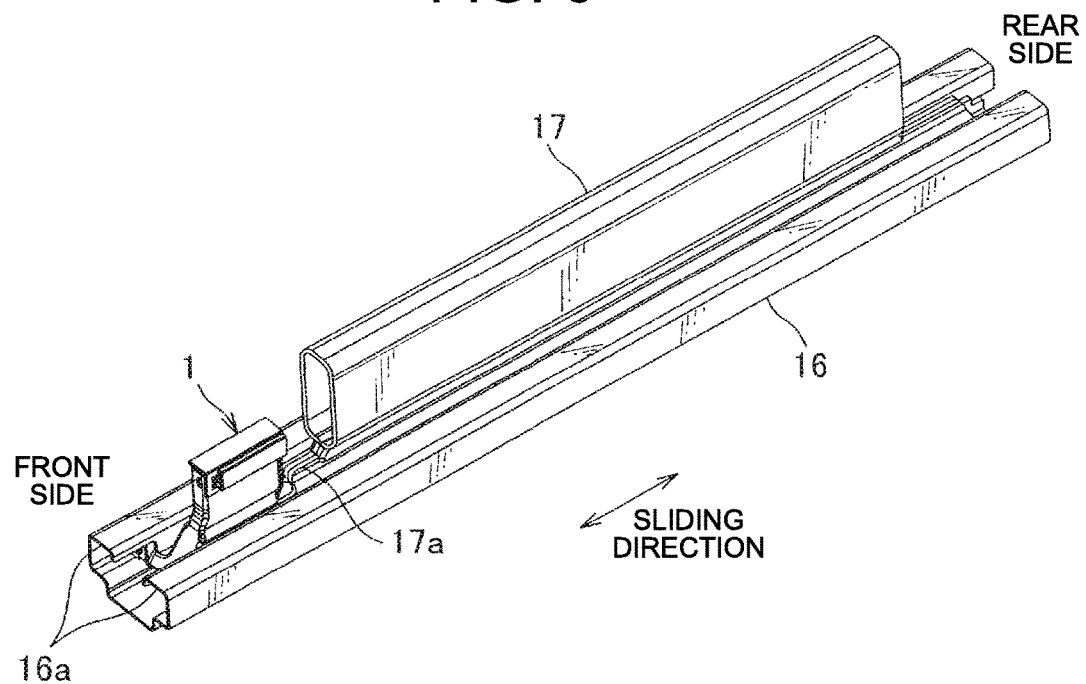
FIG. 6 is a perspective view showing the state of slidable engagement of the slide protector, together with a slide support of a seat, with a guide rail.

The slidable engagement of the slide protector 1 with a guide rail (seat rail) 16 of the vehicle floor side in FIG. 6 causes the spring member 5 in FIG. 5 to bend downward from the position of a free state illustrated with a solid line to the position of the broken line and to transform into a W-shape clearer than that of the free state. The broken line in FIG. 5 shows the substantially middle position of the thickness of the spring member 5. When it is transformed as shown by the broken line, the curved convex portion 5a in the middle of the spring member 5 protrudes to be higher than the upper wall 3b of the harness holder 2 and the front and rear curved concave portions 5b are located to be in contact with (abutting) or to have a slight clearance with the bottom wall surface 15a of the recess portion 15.

Since the curved portions 5a and 5b having opposite curvatures to each other are connected to form the spring member 5 that suppresses a vertical backlash of the slide protector 1 against the guide rail 16 (FIG. 6) of the vehicle floor, it is possible to disperse a stress acting on the spring member 5 while suppressing a backlash and to arrange the spring member 5 having a total length L in the longitudinal direction to obtain the required bending stroke S in a compact and space saving manner. The required bending stroke S means bending stroke necessary to suppress a vertical backlash of the slide protector 1 against the guide rail 16 (FIG. 6).

The spring member 5 of the embodiment in FIG. 5 shortens its total length L more than spring members without the concave portions while exhibiting a certain pressing force against the guide rail 16 by dispersing its pressing force (stress) to each of the front and rear curved concave portions 5b while pressing the curved convex portion 5a located in the middle in the longitudinal direction against an upper inner wall surface (inside face) 16a of the guide rail 16 (FIG. 6).

As shown in FIG. 5, bending the spring member 5 to obtain a concave-convex shape (W-shape) shortens the total length L of the spring member 5. Since the curved convex portion 5a in the middle of the spring member 5 is supported by the inversely curved front and rear concave portions 5b, the inclination (curvature) angle of the curved convex portion 5a can be increased compared to configurations without the concave portions to exhibit a large elastic force during the bending.

When the lower end surfaces 5b' of the front and rear curved concave portions 5b are allowed to come into contact with the bottom wall surface 15a of the recess portion 15 at the time of bending of the spring member 5, since the curved convex portion 5a in the middle bends downward to make a press contact with the upper inner wall surface 16a of the guide rail 16 (FIG. 6) with the lower end surfaces 5b' of the front and rear curved concave portions 5b used as supporting points, the curved convex portion 5a exhibits a large elastic force (pressing force) even though it is short. Therefore when the spring member 5 having a concave-convex shape (W-shape) is set to have the same spring force as a spring member without the concave portions, the width of the concave-convex shaped spring member 5 can be narrowed and compactification of the width direction of the spring member 5 can be achieved.

Further, though a spring member without the concave portions needs a stopper wall on the lower side for preventing a reversed curvature, the front and rear curved concave portions (downward convex portion) 5b of the spring member 5 in FIG. 5 come into contact with the horizontal bottom wall surface 15a of the recess portion 15 and thus the spring member 5 does not need the stopper wall for the reversed curvature prevention (because of no possibility of the reverse of curvature, no stopper wall is necessary), being capable of obtaining a bending stroke S of the spring member 5.

Moreover, the spring member 5 enhances its durability by dispersing its stress uniformly over the length in the longitudinal direction when bending. Further, since the curved convex portion 5a in the middle of the spring member 5 comes into contact with the upper inner wall surface 16a of the guide rail 16 (FIG. 6) to make a curvature contact (with a face contact close to a line contact), even when the sliding direction of the slide protector 1 with respect to the guide rail 16 changes to be opposite, the slide resistance is kept substantially constant and enable a smooth slide without scratching or the like. The pressing force of the spring member 5 against the guide rail 16 can be properly set by proper change of the thickness of the spring member 5.

As shown in FIG. 6, the slide protector 1 made of a synthetic resin on the front side and the slide support 17 of the seat side made of a metal on the rear side are engaged slidably with the guide rail 16 made of a metal and arranged horizontally on the vehicle floor side with the slide protector 1 and the slide support 17 combined as one body. In FIG. 6, for convenience, only a part of the guide rail 16 in the longitudinal direction is illustrated (the actual rail is longer than this). The slide protector 1 is coupled with a front end 17a of the slide support 17. The slide support 17 is coupled and fixed to the bottom of a slide seat (not illustrated) that is a slide structure.

Figure 7A:
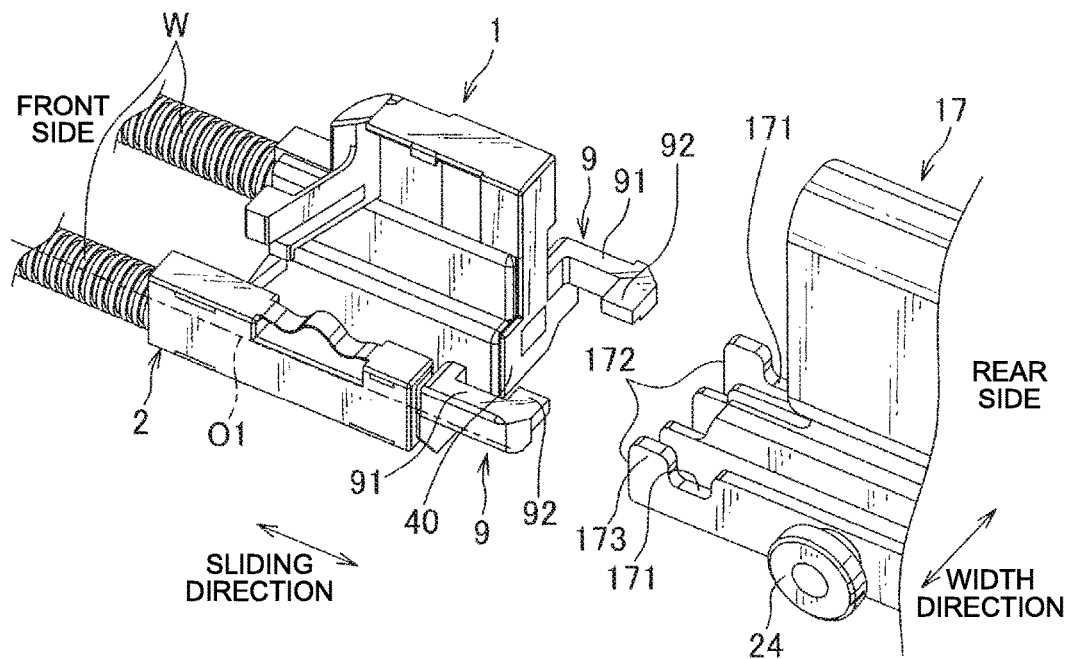
FIGS. 7A and 7B are perspective views showing an attachment structure of the slide protector in FIG. 6 to the slide support.
Figure 7B:
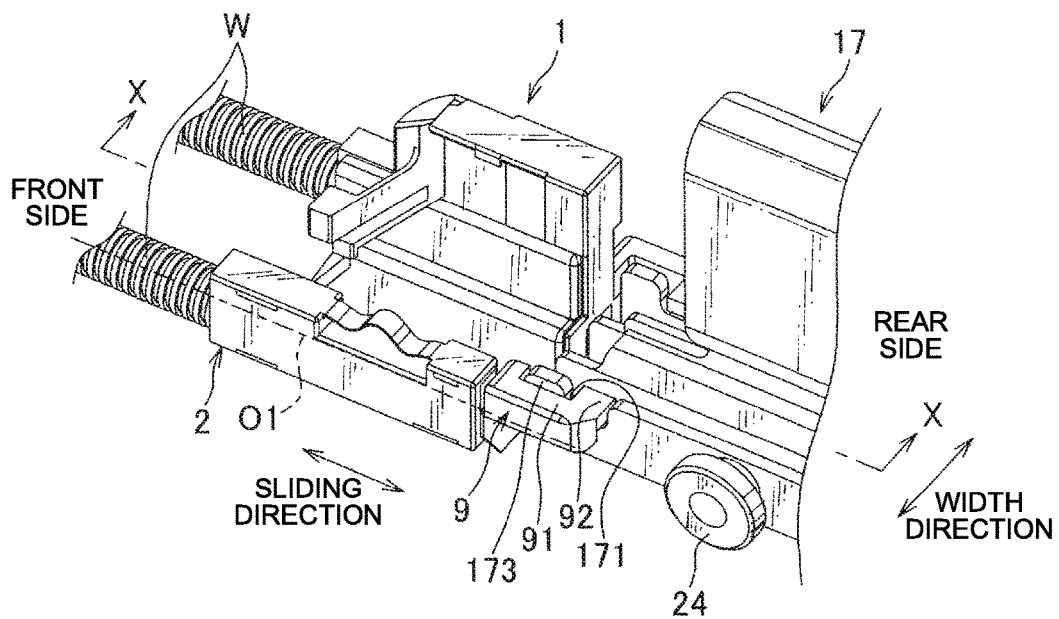
Figure 8:
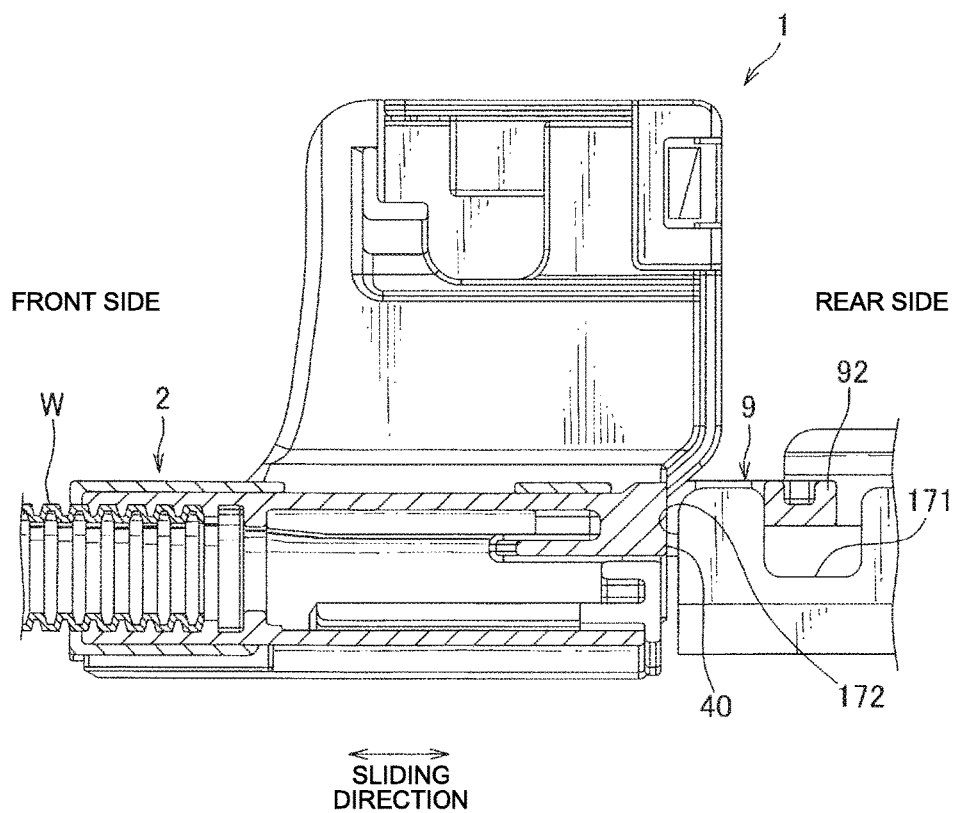
FIG. 8 is a cross-sectional view taken along a line X-X in FIG. 7B.

Here, the coupling structure of the slide protector 1 and the slide support 17, namely an attachment structure of the slide protector 1 to the slide support 17 will be described. As shown in FIG. 7A, a receiving portion 171 that has a recess shape capable of being hooked by the hooking protrusion 92 is formed on the upper surface of the front side of the slide support 17. The size of the receiving portion 171 in the sliding direction is formed to be larger than the size of the hooking protrusion 92 in the sliding direction such that the hooking protrusion 92 can easily hook the receiving portion 171 as shown in FIG. 8. Further, a contacting portion 40 with which the front end surface 172 of the slide support 17 can come into contact is formed on the side surface of the rear side of the slide protector 1 in the sliding direction. As shown in FIG. 7B, hooking of the hooking protrusion 92 on the receiving portion 171 allows the paired receiving portions 171 to be inserted between the paired hooking section 9 and allows the slide protector 1 to be attached to the slide support 17. At this time, a side surface 173 that is located on the front side of the receiving portion 171 on the slide support 17 and faces the outside in the width direction comes into contact with the inner side surface of the arm 91 in the width direction. That is, unless the arms 91 spread more widely in the width direction by a length greater than the protruding length of the hooking protrusions 92, the hooking protrusion 92 does not come off the receiving portion 171. In this case, each arm 91 extends along the central axis O1 of the wire harness W held in the harness holder 2, and the harness holder 2 and the hooking section 9 are arranged next to each other on the central axis O1 (in the sliding direction).

According to the attachment structure described above, when the slide support 17 slides rearward in the sliding direction, hooking of the hooking protrusions 92 on the receiving portions 171 allows the slide protector 1 to be pulled rearward. On the other hand, when the slide support 17 slides frontward in the sliding direction, contact of the front end surface 172 of the slide support 17 with the contacting portion 40 allows the slide protector 1 to be pushed frontward. Hence, the slide protector 1 can be attached to the slide support 17 for conducting a following movement by a simple structure. Further, since a backlash between the slide protector 1 and the guide rail 16 is suppressed as described later, despite an attachment with a simple configuration, reliability of the attachment structure can be secured.

When the slide support 17 slides rearward in the sliding direction and the slide protector 1 is pulled rearward, the wire harness W attempts to resist by the elasticity of the corrugate tube and produces a resistance force. In this case, as the hooking section 9 and the harness holder 2 holding the wire harness W are formed integrally, the reliability of the attachment structure of the slide protector 1 to the slide support 17 can be enhanced. Moreover, as the harness holder 2 and the hooking section 9 are arranged next to each other on the central axis O1, the resistance force of the wire harness W can be easily transmitted to the arm 91 and the hooking protrusion 92 on the end thereof and compared to a configuration in which the harness holder and the hooking section are arranged apart from each other in the width direction or vertically, the force is not transmitted easily to parts between the harness holder 2 and the hooking section 9 and damage can be suppressed.

Since the arms 91 extend along the inner wall surfaces of the guide rail 16, a transformation in which the arms 91 spread out in the width direction and which is caused when the resistance force of the wire harness W forces the hooking protrusions 92 to come off the receiving portions 171 can be suppressed. Further, since the hooking protrusions 92 do not come off the receiving portions 171 unless the arms 91 spread out in the width direction more widely by a length greater than the protruding length of the hooking protrusions 92, and the clearance between each arm 91 and the inner wall surface of the guide rail 16 is smaller than the protruding length of the hooking protrusions 92, the separation of the hooking protrusions 92 from the receiving portions 171 can be restrained even if the resistance force of the wire harness W is large.

Figure 9:
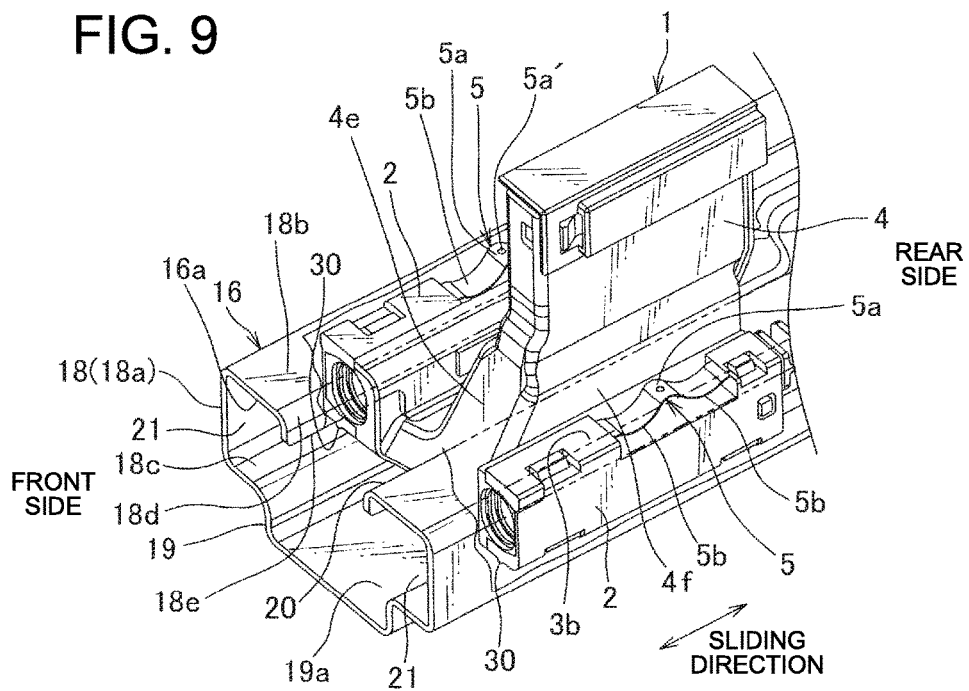
FIG. 9 is a perspective view showing an embodiment of a backlash restraining structure of the slide protector.
Figure 10:
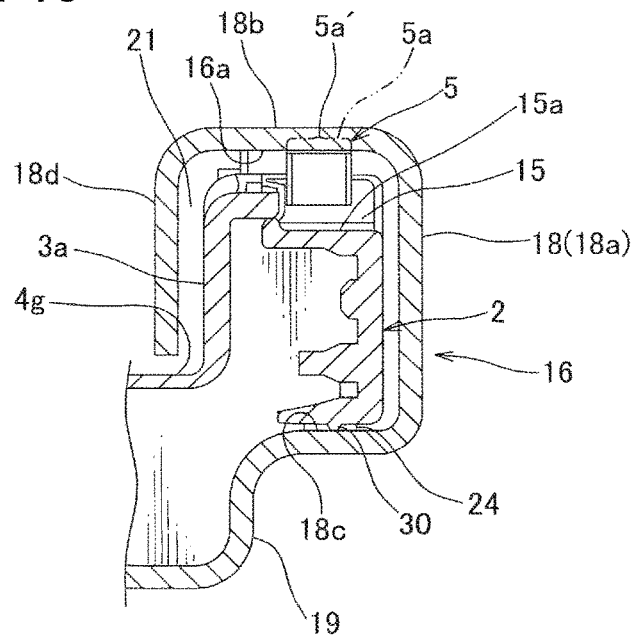
FIG. 10 is a lateral cross-sectional view showing principal parts of the backlash restraining structure of the slide protector.

As shown in FIGS. 9 and 10, the guide rail 16 includes a wide portion 18 on the upper side and a narrow portion 19 on the lower side, and the wide portion 18 on the upper side has a slit 20 located in the middle in the width direction and right and left grooves 21. Each of the right and left grooves 21 is formed by being surrounded by a vertical outer wall 18a, an upper and lower horizontal walls 18b and 18c and an inner wall 18d hanging down from the upper wall 18b, and has an inner opening 18e on the lower side of the inner wall 18d, communicating with the central slit 20 and the grooves 21. The narrow portion 19 on the lower side communicates with the slit 20 and is formed into a downward projection and a bottom wall 19a of the narrow portion 19 has holes (not illustrated) for fixing on a vehicle floor.

The right and left paired harness holders 2 of the slide protector 1 is inserted into the right and left grooves 21 of the guide rail 16, and the foot walls 4e and 4f of the harness leading section 4 towering at the center of the slide protector 1 are arranged in the slit 20 in the middle of the guide rail 16 and the body of the harness leading section 4 is arranged to protrude above the slit 20.

Each spring member 5 formed on the upper wall 3b side of each harness holder 2 is slidably and elastically in contact with the upper inner wall surface 16a of each of the right and left grooves 21 of the guide rail 16. A small circular projection 5a' for contact is provided on the top surface of the curved convex portion 5a protruding upward in the middle of the spring member 5 of the present example. The spring member 5 in FIG. 10 is illustrated as the free state (state before bending).

In FIG. 10, the symbol 3a denotes an inner wall of the harness holder 2, the symbol 4g denotes a connecting wall and the symbol 24 denotes rollers to be described later. The slide protector 1 of an example in FIGS. 6 to 12 has the opening 10 and the guide wall 11 for leading the harness located on the left side surface 4d of the slide protector 1 in FIG. 1 on the right side surface 4b (the slide protectors 1 in FIGS. 1 and 9 are for a right side seat and a left side seat of a vehicle).

The rollers 24 provided on the right and left lower side surfaces of the slide support 17 are rotatably in contact with the upper and lower inner wall surfaces 16a and 18c of the right and left grooves 21 of the guide rail 16. The curved convex portion 5a in the middle of each of right and left spring members 5 of the slide protector 1 is in elastic contact with the upper inner wall surface 16a of the groove 21 of the guide rail 16 on the front side of the rollers 24. FIG. 10 shows the spring member 5 in its free state (state before bending). Right and left paired rollers 24 of the slide support 17 (not illustrated) are arranged also on the rear side.

Figure 11:
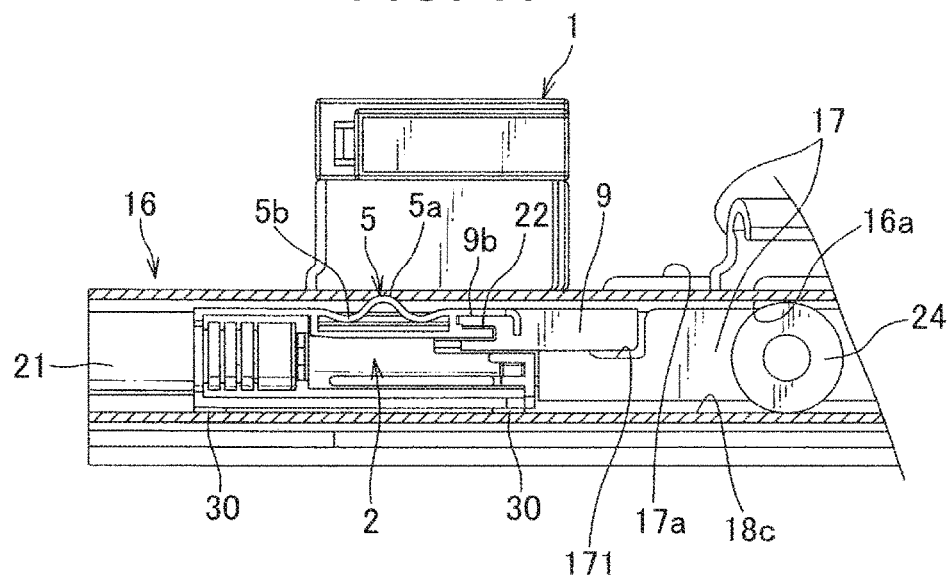
FIG. 11 is a longitudinal cross-sectional view showing the backlash restraining structure of the slide protector.

Here, details of the state of contact of the slide protector 1 with the guide rail 16 will be described. The slide protector 1 is in contact with the lower inner wall surface 18c by using two projections 30 as shown in FIG. 11 as well as the upper inner wall surface 16a by using the convex portion 5a of the spring member 5. That is, the slide protector 1 is in contact with the guide rail 16 at three points and has contact points forming a triangle including the convex portion 5a and the two projections 30 on each side.

Therefore, even when the inner wall surface 18c of the guide rail 16 is not flat (for example, a concave-convex or corrugated surface is formed), the triangular contact points can be maintained and a backlash against the guide rail 16 when the slide protector 1 slides can be restrained. In this case, since the two projections 30 are provided at both ends of the wall 3c in the sliding direction, the base of the triangle formed by the contact points can be lengthened and the inclination of the entire slide protector 1 with respect to the longitudinal direction of the guide rail 16 can be reduced when the projections 30 pass over a concave-convex surface or the like of the inner wall surface 18c.

Figure 12:
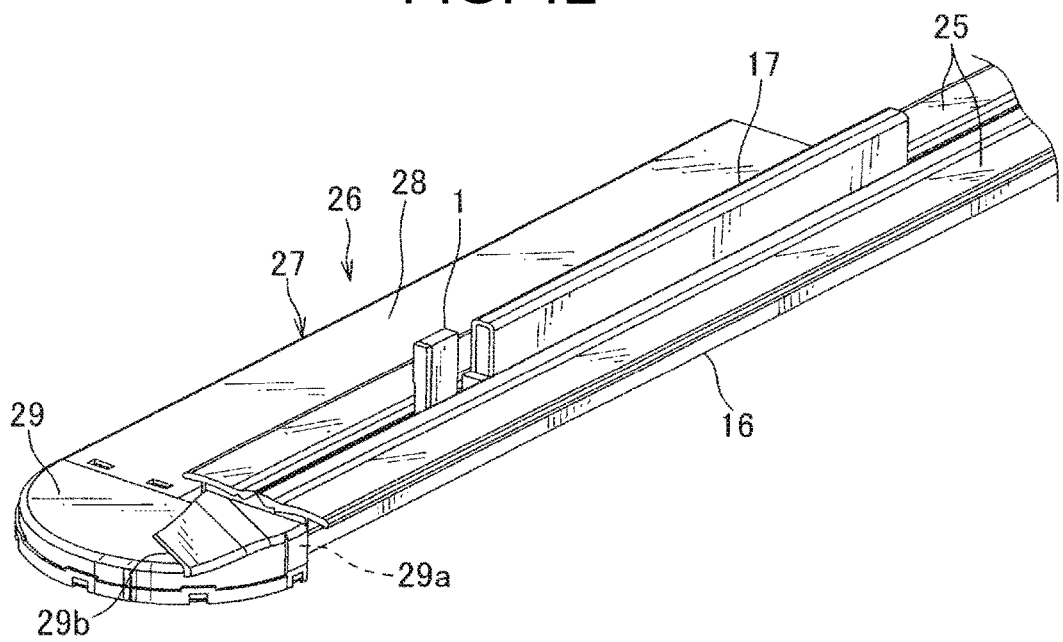
FIG. 12 is a perspective view showing an embodiment of a power supply device extending along the guide rail and including the slide protector.

As shown in FIG. 12, right and left malls 25 for dust protection are arranged on the upper side of the guide rail 16 on a vehicle floor, and a cable housing section 27, made of a synthetic resin or a metal, of a power supply device 26 is arranged along the guide rail 16 under one side of the malls 25 with the cable housing section 27 lapped over the one side of the malls 25. The cable housing section 27 is constituted of an oblong straight portion 28 and a wide semicircular portion 29 arranged on the front end side of the straight portion 28, and a rear opening 29a on the other side of the semicircular portion 29 communicates with a front opening of the guide rail 16.

Wire harnesses (not illustrated) are housed in the straight portion 28 of the cable housing section 27 with the wire harnesses bent in a U-shape (the turn-back part is arranged on the rear side), and one side of the wire harness is turned back rearward in a curve shape in the semicircular portion 29 and continues to the slide protector 1 and then distributed to a slide seat (not illustrated) on the upper side from the slide protector 1. The other side of the wire harness is led out from a leading portion 29b on the upper side of the semicircular portion 29 and wired along a vehicle floor. The power supply device 26 is constituted of the slide protector 1, the cable housing section 27 and the wire harnesses.

In accordance with the advance or retreat of the slide seat (not illustrated), the slide protector 1 advances or retreats, as one body, together with the slide support 17 connected to the seat. When the seat retreats, the wire harnesses retreat straight together with the slide protector 1 as one body in the guide rail 16 and the wire harnesses in the straight portion 28 of the cable housing section 27 are shortened. When the seat advances, the wire harnesses advance straight together with the slide protector 1 as one body in the guide rail 16 and the wire harnesses in the straight portion 28 of the cable housing section 27 are elongated. The cable housing section 27 functions as a harness surplus length absorbing section.

When the slide protector 1 receives a vertical force because of the seat advance and retreat movement or by vibrations or the like during vehicle traveling, the curved concave-convex shaped spring member 5 absorbs the vertical force by a secure bending stroke and restrains a vertical backlash of the slide protector 1. Due to this, occurrence of wear or unusual sounds can be prevented.

In the above-described embodiment, the hooking sections 9 have the arms 91 extending along the inner wall surfaces of the guide rail 16 and the hooking protrusions 92 protruding toward each other so as to be capable of hooking the receiving portion 171, and further the hooking sections 9 are constituted as a pair. However, the hooking section is not limited to this shape and only has to be capable of hooking the slide support 17 and formed integrally with the harness holder 2. For example, the hooking section may be configured such that one arm extends in the sliding direction and two hooking protrusions protrude from this arm toward sides opposite to each other in the width direction (that is, the entire hooking section can be formed to be T-shaped). Further a recess-shaped receiving portion does not need to be formed on the slide support 17 and the hooking section may be hooked on a proper portion such as a step on the slide support. Still further, even if the arm is located away from the inner wall surface of the guide rail, increase of the protruding length of the hooking protrusion or increase of the strength of the arm to make it difficult for the arm to transform can restrain the disengagement of the hooking section from the receiving portion.

In the above-described embodiment, though the slide protector 1 has the contacting portion 40, the slide protector do not need to have the contacting portion, and for example the protrusion of the hooking section may be configured to have substantially the same length as that of the concave portion in the sliding direction to fit in and the slide protector may follow with the protrusion of the hooking section pushed by the slide support.

What is claimed is:

1. A slide protector slidably engaged with a guide rail in a sliding direction together with a slide support for supporting a seat upward, the slide support being slidably inserted into the same guide rail as the slide protector, the slide protector comprising:
   a harness holder configured to hold a wire harness; and
   a pair of hooking sections integrally formed with the harness holder and configured to hook the slide support,
   wherein the slide protector is coupled with an end of the slide support,
   wherein the hooking section has an arm extending in the sliding direction, and a hooking protrusion protruding from the arm in a direction perpendicular to the sliding direction and configured to be capable of hooking a recess-shaped receiving portion formed on the slide support,
   wherein the pair of the hooking sections are arranged such that a pair of the receiving portions are pinched between the pair of the hooking sections in the direction perpendicular to the sliding direction, and
   wherein the arm extends along an inner wall surface of the guide rail.

2. The slide protector according to claim 1, further comprising a contacting portion located on a side surface at one side of the slide protector in the sliding direction and configured to be capable of coming into contact with the slide support which slides toward another side.

3. The slide protector according to claim 1, wherein each hooking protrusion protrudes toward the opposing hooking section.

4. The slide protector according to claim 1, wherein the pair of hooking sections is formed integrally with an inner wall of a surrounding wall of the harness holder.

5. The slide protector according to claim 1, wherein the pair of hooking sections is arranged in a row in a width direction that is substantially perpendicular to the sliding direction.

6. A slide protector slidably engaged with a guide rail in a sliding direction together with a slide support for supporting a seat upward, the slide support being slidably inserted into
- the guide rail as the slide protector, the slide protector comprising:
- a harness holder configured to hold a wire harness;
- a spring member integrally formed with the harness holder; and
- a hooking section integrally formed with the harness holder and configured to hook the slide support,
- wherein the slide protector is configured to be coupled with an end of the slide support, and
- wherein the spring member of the harness holder contacts the guide rail.

* * * * *